United States Patent [19]

Cordon

[11] Patent Number: 4,482,010
[45] Date of Patent: Nov. 13, 1984

[54] METHOD AND APPARATUS FOR STORING ENERGY

[76] Inventor: William A. Cordon, 1090 N. 1800 East, Logan, Utah 84321

[21] Appl. No.: 450,996

[22] Filed: Dec. 20, 1982

Related U.S. Application Data

[62] Division of Ser. No. 185,353, Sep. 8, 1980, Pat. No. 4,367,788.

[51] Int. Cl.³ .............................................. F28D 21/00
[52] U.S. Cl. ....................................... 165/53; 165/10; 165/DIG. 4
[58] Field of Search ..................... 165/10, 53, DIG. 4; 126/430

[56] References Cited

U.S. PATENT DOCUMENTS

| | | | |
|---|---|---|---|
| 4,003,426 | 1/1977 | Best et al. ............................. | 165/10 |
| 4,221,259 | 9/1980 | Ronc et al. ......................... | 165/10 X |
| 4,259,401 | 3/1981 | Chahroudi et al. .............. | 165/10 X |

Primary Examiner—Albert W. Davis, Jr.
Attorney, Agent, or Firm—B. Deon Criddle

[57] ABSTRACT

A method and apparatus for using phase-change compounds for insulating purposes. Selected phase-change compounds are stored in the voids of particles of suitable insulating materials that are maintained surface dry whereby temperatures of walls and ceilings containing such insulation are maintained at a much more constant temperature than can be achieved using insulating materials alone.

7 Claims, 9 Drawing Figures

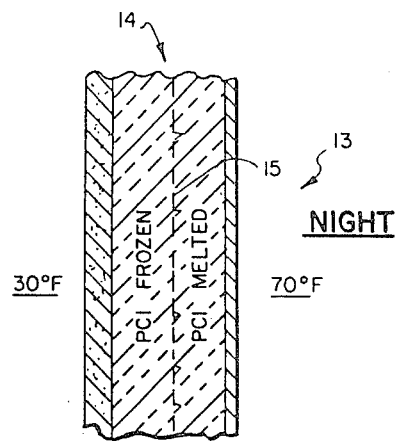
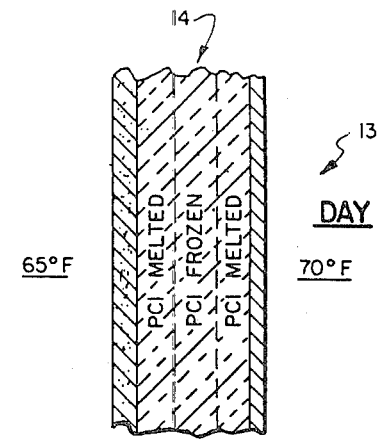
Fig. 3a                    Fig. 3b
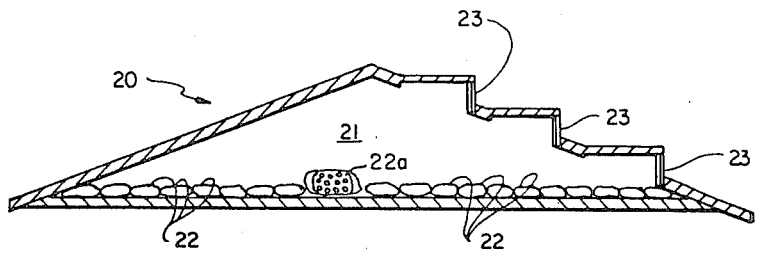
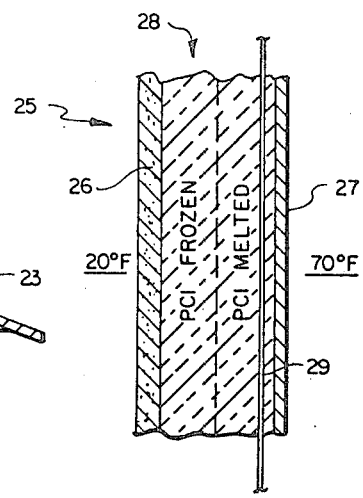
Fig. 4                     Fig. 5
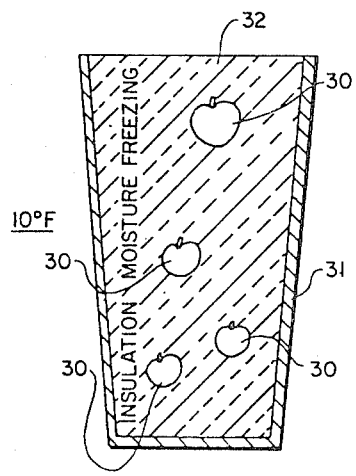
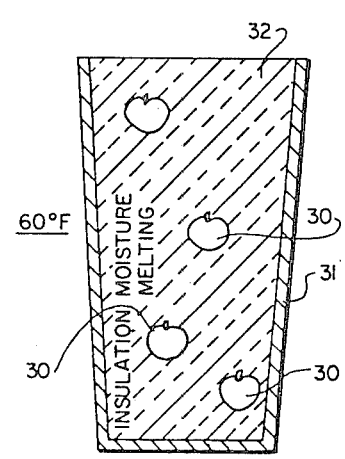
Fig. 6                     Fig. 7

METHOD AND APPARATUS FOR STORING ENERGY

This is a divisional of application Ser. No. 185,353 filed on Sept. 8, 1980 now U.S. Pat. No. 4,367,788 granted Jan. 11, 1983.

BRIEF DESCRIPTION OF THE INVENTION

1. Field of the Invention

This invention relates to insulting materials and to a method of making such materials.

2. Prior Art

It has long been recognized that porous type minerals can be used to provide insulation for buildings and the like. It has also been recognized that some materials will absorb large quantities of liquids. I have discovered that a porous type material such as expanded perlite will absorb 100% of its weight of liquid while still remaining saturated surface dry and retaining insulating value.

It has also been recognized in the past that certain phase-change compounds having high melting temperatures can be used to store heat in solar heat systems. This has involved capturing solar heat and transferring it to compounds which have a high latent heat of fusion. Typically, such compounds melt at temperatures in the range of 70° F. to 90° F. and have a heat of fusion of about 40 calories per gram.

OBJECTS OF THE INVENTION

Principal objects of the present invention are to provide a method of storing heat and/or cold using the insulating and absorption properties of porous type materials, such as perlite, and the melting and freezing characteristics of phase-change compounds. Because of the ability of the insulation to store heat or cold, any heat or cold energy penetrating a wall or ceiling will not be lost but will be stored for later use.

FEATURES OF THE INVENTION

Principal features of the invention are the storage of phase-change compounds in the voids of porous materials, themselves having good insulating properties to form a superior insulating material to be incorporated in the walls of buildings or storage structures whereby minimal thermal transfer is permitted between opposite faces of the walls.

The superior insulating material of the invention is formed by mixing the porous-type material used, for example perlite, with a suitable phase-change compound, for example sodium sulfate decahydrate, having a very high latentheat of fusion at near room temperature. The mixing is performed at a temperature above the melting temperature of the phase-change compound used and the amount of compound mixed is controlled so that the insulating value of the porous material is not destroyed.

Other objects and features of the invention will become obvious to the person skilled in the art from the following detailed description and claims.

THE DRAWINGS

In the drawings:

FIG. 1 shows a typical idealized model heat transfer diagram for the insulating material of the invention;

FIG. 2a, a schematic cross-section diagram of a wall using the insulation of the invention and showing the wall in a typical daytime condition;

FIG. 2b, a view like that of FIG. 2a, but showing the wall in a typical nighttime condition;

FIG. 3a, a view like that of FIG. 2a, but showing a wall or panel located in a colder climate;

FIG. 3b, a view like that of FIG. 3a, but showing the wall in a typical nighttime condition;

FIG. 4, a schematic cross-section taken through the upper portion of a building, showing use of the insulating material of the invention with one being illustrated enlarged and broken open to show particles saturated but surface dry;

FIG. 5, a similar view taken through a wall of a building and showing another use of the insulating material of the invention;

FIG. 6, a vertical cross-section view through a container having apples, surrounded by insulation material of the invention therein during very cold climatic conditions; and FIG. 7, a view like that of FIG. 6, but during warmer climatic conditions.

DETAILED DESCRIPTION

Figure 1:
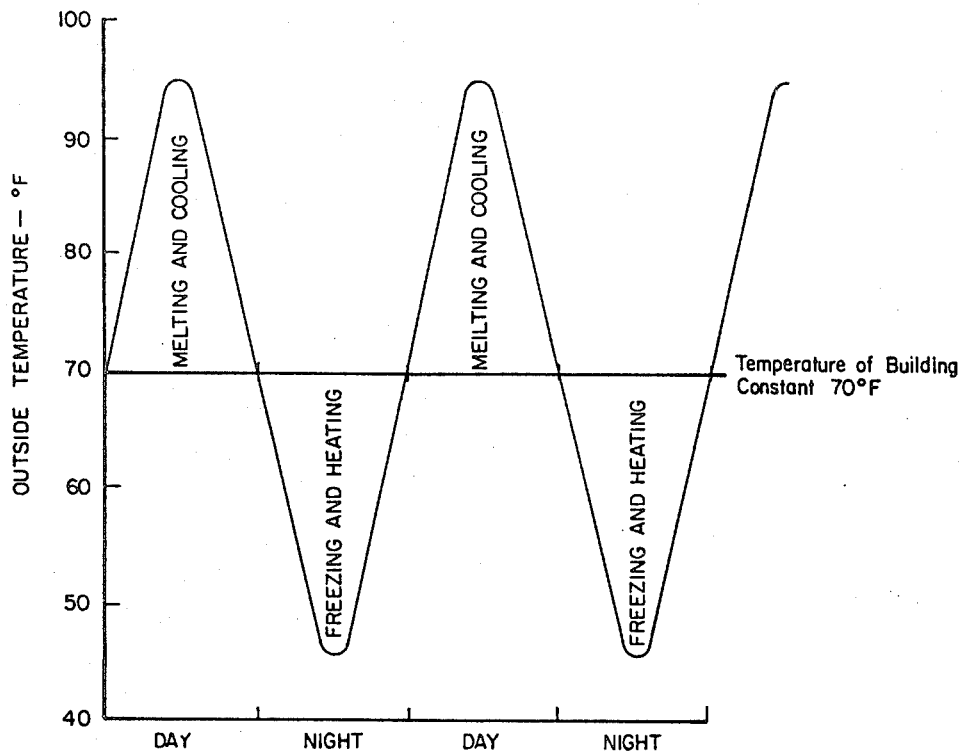

Referring now to the drawings:

The present invention comprises a superior insulating material made by filling the voids of a porous mineral material, such as perlite particles with the maximum amount of phase-change compound, i.e. sodium sulfate decahydrate (Glauber's salt) that can be retained by the porous material without adversely affecting the insulting capabilities of the porous materials. For example, it has been found that ten pounds of porous perlite material can easily absorb up to four pounds of melted Glauber's salt compound completely within the voids of the particles and the particles will remain surface dry. When the phase-change compound and perlite are mixed the voids of the particles act as reservoirs for storage of the compound.

The actions of an idealized model of the energy storage insulation are shown in FIG. 1. In the model shown, the phase-change compound has a melting temperature of 70° F. The mean ambient temperature for the locality of use of the insulating material is also 70° F., but the temperature fluctuates from 95° F. in the daytime to 45° F. at night. The system shown is balanced, with the insulating material absorbing all of the heat energy resulting from ambient thermal changes before such heat energy can fully penetrate to an inner surface of a pack of the surface dry insulating material particles saturated with a phase change. Thus, the phase-change compound will freeze at night and will melt in the day within the voids of the loose particles of the insulating material carrier, while the interior room temperature will stay constant at 70° F. With the alternate freezing and melting the heat of fusion of the phase-change compound will balance out the heat and cold. Under these conditions, a home provided with the present insulating material in the walls thereof could effectively have heating and air conditioning to maintain the interior of the home at 70° F. without using any outside energy source.

Even in climates where the temperature variation from day-to-night or from season-to-season may not permit a balanced design, using the insulating material of the invention, the insulating material can greatly reduce the heating and air conditioning otherwise required to provide a comfortable living locale.

Figure 2A:
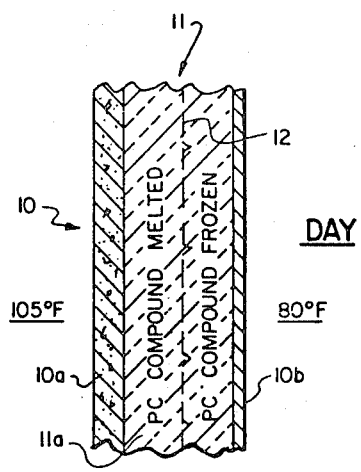
Figure 2B:
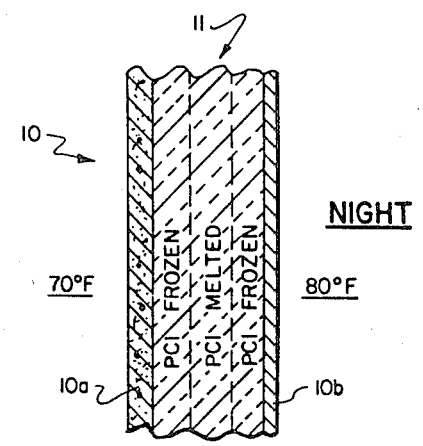

For example, as shown in FIGS. 2a and 2b, where the climate is hot and varies from 70° F. at night to 105° F.

in the day, the building walls and ceiling, as exemplified by a wall 10 having an exterior cover 10a and an interior cover 10b may be filled with insulating material 11 of the present invention made up of 70 percent perlite and 30 percent Glauber's salt which melts at 89° F. The interior room conventional air conditioning system control thermostat would then be set at 80° F.

As seen in FIG. 2, the phase-exchange compound 11a next to the inside of the room will be frozen by the air conditioning. During the day, as the heat energy moves as a front 12 through the insulating material from the outside, it will melt the frozen compound. During such melting the eighteen thousand calories of heat per pound of compound which would normally penetrate through the wall will be used to melt each pound of frozen compound. Thus, penetration of the heat energy fully through the wall to heat the interior of the room will not occur until late in the day, and after the compound has melted. As the ambient temperature drops to 70° F. at night, the compound will freeze from both the inside (due to the operating air conditioning system) and from the outside. The frozen compound is then available to assist the air conditioning the next day.

As shown in FIGS. 3a and 3b, when the insulation of the invention is used in a wall 13 located in colder climates, with temperatures varying from 30° F. at night to 65° F. in the day, a phase-change compound having a melting point of about 60° F. is used in the insulating material 14 of the invention. In this situation, the higher daytime interior and exterior temperatures will melt the phase-change compound to store heat energy. At night no cold front 15 below 60° F. will pass fully through the insulating material until all of the compound is solidified. Eighteen thousand calories of heat energy are stored in each pound of compound of the insulating material and must be absorbed before the cold energy will affect the interior of the room.

As illustrated in FIGS. 4 and 5, an insulating material incorporating a phase-exchange compound having a higher melting temperature such as 70° F., can be advantageously used even in colder climates. Such insulating material requires other energy sources such as solar energy panels focusing heat on them during the day, or the use of "off-peak" electrical energy to melt the phase-exchange compound. The collected heat energy is then released at "peak hours" to improve the efficiency of the power system. The interior of the wall of insulating material will stay at 70° F. until the compound is frozen.

In FIG. 4, a pitched roof 20 and the attic 21 of a building are shown. Bags 22 of insulting material 22a of the type heretofore disclosed having a melting temperature of 70° F. are placed in the attic. Windows 23 are directed and positioned in the roof such that the rays of the winter sun will pass through to act on the insulation bags 22. The sun energy thus melts the insulating material which must freeze again in response to ambient temperatures before the outside cold will penetrate through the attic to the interior of the building.

In FIG. 5, a wall 25 including an outer facing sheet 26 and an inner facing sheet 27 have insulation material 28 of the invention between the sheets. An electrical heating element 29 passes through the insulating material adjacent to the inner facing sheet thereof. The electrical heating element is energized during off-peak power use times so that lowest cost electrical power is used. Energization of the electrical heating element will melt the insulation material so that re-freezing must occur in response to outside ambient temperatures before the cold from outside will pass through the wall.

While the insulating material of the invention has been found to be highly suitable for use as a wall and ceiling insulation material for buildings, it can also be advantageously used in providing insulation for refrigerators, ice boxes, coolers and other such structures.

As shown in FIGS. 6 and 7, for example, water can serve as the phase-change compound of the insulating material for some purposes. Apples, for example, are ideally stored at 32° F., which, of course, is also the freezing point of water. As shown, apples 30 were stored in a container 31 surrounded by insulation material 32 comprising a mixture of 70% perlite and 30% water. The container 31 was stored in an unheated building. As the ambient temperature fell below 32° F. the water in the insulation material began to freeze but the temperature around the apples did not fall below 32° F. until all of the water had frozen. As the temperature rose above 32° F. the temperature around the apples remained at 32° F. until all of the frozen water in the insulation had melted.

By taking advantage of the heat of fusion of the water, mixed with the porous mineral insulation, it was possible to avoid extreme warm and cold temperatures and the apples remained in excellent condition for eight months throughout the fall, winter and spring, even though ambient temperatures ranged between 5° F. and 60° F. during the storage period.

It will be apparent from the examples given that a single phase-change insulation material will not be adequate for all uses or geographical areas. It will also be apparent that for many climates, i.e. warm or cold climates a phase-change insulation material utilizing a proper phase-change compound can be developed. For areas where wide temperature extremes are experienced during different seasons, non-eutectic compounds having a wide range of freezing temperatures and melting temperatures may be useful. Layers of phase-change insulation materials having different melting characteristics may also be used. Such layers can be achieved in different ways, but a suitable method is to place the materials in sealed bags and then to place bags of insulation materials with desired different phase-change compounds in face-to-face relationships as wall or ceiling insulation. Also, it is sometimes necessary and desirable to store the insulation of the invention incorporating a phase-change compound in a sealed bag that will prevent evaporation of the liquids used.

In the southwest United States, where summer heat is a major problem and winter cold is not of major consequence, a phase-change insulation that will compliment air conditioning is desirable. In cold climates, where summer heat is not a major problem, heat storing insulation is best for use. In locations where it is hot in the summer and cold in the winter, a combination of heat storing and cold storing insulations may be needed.

With the insulating material of the present invention, significant energy cost savings can be realized. For example, in a typical installation 490 cubic feet of insulation is used in the walls of an average 1200 square foot home and 1200 cubic feet of the insulation material is used in the attic. If three pounds of phase-change compound is mixed with each cubic foot of insulation and the phase-change compound has a heat of fusion of 40 cal per gram, then ninety-two million calories of heat would be stored each time all the compound melted. This amounts to an equivalent of 107.08 kwh of electrical energy. If melting occurred once each day, estimated potential savings in operating costs could be $10.70 per day. This, of course, would only occur under ideal conditions but the example clearly illustrates a potential for savings under any condition.

While perlite has been specifically mentioned herein as a suitable porous mineral material suitable for use as the insulating carrier for the phase-change compounds disclosed other porous materials, for example, and without limitation, granulated slag, pumice, and vermiculite could be used.

Also, although Glauber's salt and water have been heretofore specifically identified as being suitable phase-change compound for use in the present insulating material, other phase-change compounds such as calcium chloride hexahydrate which melts at 81° F., disodium hydrogen phosphate which changes phase at about 95° F., refined parofin wax, which melts at about 115° F., or other suitable material could be used.

Other phase-change compounds can be readily developed to meet the climatic conditions of any particular location.

Although a preferred form of my invention has been herein disclosed, it is to be understood that the present disclosure is made by way of example and that variations are possible without departing from the subject matter coming within the scope of the following claims, which subject matter I regard as my invention.

I claim:

1. An insulating material comprising
   a porous carrier material having voids therein forming reservoirs;
   a phase-change compound substantially filling the voids of the porous carrier material particles until the porous carrier material particles are saturated but surface dry, whereby the compound in the reservoirs will change from a solid to a liquid state when subjected to a predetermined ambient temperature; and
   bag means surrounding the porous carrier material and phase-change compound held therein to prevent liquid evaporation from the phase change compound.

2. An insulating material as in claim 1, wherein the porous carrier material is selected from the group comprising perlite, granulated slag, pumice and vermiculite.

3. An insulating material as in claim 2, wherein the phase-change compound is selected from the group comprising Glauber's salt, water and calcium hexahydrate.

4. An insulated panel comprising
   an inner facing sheet;
   an outer facing sheet;
   insulating material positioned between said inner and outer facing materials, said insulating material comprising
   a porous carrier material having voids therein forming reservoirs, and
   a phase-change compound substantially filling the voids of the porous carrier material particles until the porous carrier material particles are saturated but surface dry, whereby the compound in the reservoirs will change from a solid to a liquid state when subjected to a predetermined ambient temperature.

5. An insulated panel as in claim 4, wherein
   the insulating material is contained within flat bag means.

6. An insulated panel as in claim 4, wherein the porous carrier material is selected from the group comprising perlite, granulated slag, pumice and vermiculite.

7. An insulated panel as in claim 6, wherein the phase-change compound is selected from the group comprising Glauber's salt, water and calcium hexahydrate.

* * * * *